US006550793B2

(12) United States Patent
Carter (10) Patent No.: US 6,550,793 B2
(45) Date of Patent: Apr. 22, 2003

(54) ONE-PIECE MOLDED/COPOLYMERIC WHEELED DISPLAY CASE

(76) Inventor: Wallace T. Carter, 1918 Verrazzano Dr., Wilmington, NC (US) 28405

( * ) Notice: Subject to any disclaimer, the term of this patent is extended or adjusted under 35 U.S.C. 154(b) by 0 days.

(21) Appl. No.: 09/808,985

(22) Filed: Mar. 16, 2001

(65) Prior Publication Data

US 2002/0130476 A1 Sep. 19, 2002

(51) Int. Cl.⁷ .................................................. B62B 1/00
(52) U.S. Cl. .............................. 280/47.26; 280/47.24; 280/47.34; 280/37; 280/DIG. 6
(58) Field of Search ........................... 280/47.16, 47.17, 280/47.18, 47.26, 47.31, 47.34, 37, 645, 42, 651, 652; 206/315.6, 315.5, 315.7, 315.8, 315.3, 315.4, 315.2; 190/119, 120, 18 A (56) References Cited

U.S. PATENT DOCUMENTS

| | | | | |
|---|---|---|---|---|
| 2,667,397 A | * | 1/1954 | Hollisey ........................ 312/250 |
| 2,760,782 A | * | 8/1956 | Hartzell ........................ 280/655 |
| 2,804,230 A | * | 8/1957 | Attias et al. .................... 220/38 |
| 3,876,223 A | * | 4/1975 | O'Reilly et al. ............. 280/47.19 |
| 4,012,051 A | * | 3/1977 | Embinder ..................... 280/47.19 |
| 4,118,048 A | * | 10/1978 | Spranger et al. ........... 280/47.35 |
| 4,166,530 A | * | 9/1979 | Robinson .................... 206/315.9 |
| 4,401,312 A | * | 8/1983 | Parker ......................... 280/47.17 |
| 4,575,109 A | * | 3/1986 | Cowdery ......................... 280/37 |
| 4,635,950 A | * | 1/1987 | Sage et al. .................. 280/47.26 |
| 4,726,597 A | * | 2/1988 | Hickin ......................... 280/47.17 |
| 4,767,001 A | * | 8/1988 | Kim ............................ 206/315.3 |
| 4,890,856 A | * | 1/1990 | Mursch et al. ................. 280/646 |
| 4,905,827 A | * | 3/1990 | Kim ............................ 206/315.3 |
| 4,972,966 A | * | 11/1990 | Craft, Jr. ......................... 220/264 |
| 5,071,147 A | * | 12/1991 | Stansbury ................... 280/47.19 |
| 5,088,750 A | * | 2/1992 | Beese et al. ................. 280/47.26 |
| 5,207,723 A | * | 5/1993 | Newby, Sr. ................ 312/249.11 |
| 5,306,028 A | * | 4/1994 | Pike et al. ................... 280/47.35 |
| 5,323,923 A | * | 6/1994 | Schauer ......................... 220/337 |
| 5,455,397 A | * | 10/1995 | Havenhill et al. ........... 200/61.39 |
| 5,511,682 A | * | 4/1996 | Pace ............................. 220/404 |
| 5,551,562 A | * | 9/1996 | Beretta ........................... 206/317 |
| 5,570,895 A | * | 11/1996 | McCue et al. .............. 280/47.19 |
| D382,997 S | * | 9/1997 | Carr et al. ..................... D3/274 |
| 5,683,097 A | * | 11/1997 | Fenton et al. ............... 280/655.1 |
| 5,730,451 A | * | 3/1998 | Walker ........................ 280/47.26 |
| 5,783,395 A | * | 7/1998 | Saito ............................... 435/6 |
| 6,145,856 A | * | 11/2000 | Conti .......................... 280/47.26 |
| D437,484 S | * | 2/2001 | Tiramani et al. ............... D3/279 |
| 6,217,042 B1 | * | 4/2001 | Kurtz et al. ..................... 280/37 |

* cited by examiner

Primary Examiner—Brian L. Johnson
Assistant Examiner—Bridget Avery
(74) Attorney, Agent, or Firm—Diller, Ramik & Wight (57) ABSTRACT

A wheeled container includes a one-piece molded polymeric/copolymeric container body defined by an elongated housing closed at a first end by a bottom wall ad having an opposite second end defining an opening. A one-piece molded polymeric/copolymeric cover is pivotally connected to a peripheral edge portion of the container body second end for pivotal movement between a first closed and a second open position respectively closing and opening the container second end opening. The cover has a handle projecting substantially radially away from a longitudinal axis of the housing, and a pair of relatively spaced wheels are located at the first end of the container at a side of the housing corresponding to a side from which the handle projects. Latches are disposed substantially diametrically opposite to the handle for retaining the cover in the closed position.

32 Claims, 5 Drawing Sheets

ONE-PIECE MOLDED/COPOLYMERIC WHEELED DISPLAY CASE

BACKGROUND OF THE INVENTION

The invention is directed to a wheeled container and specifically a wheeled display case into which can be packaged rolled-up or rollable trade show graphics, displays, portable display frames, such as conventional folding, knock-down or sectional display frames, and associated display accouterments which are utilized at trade shows, conventions and similar exhibit forums.

Wheeled containers are well known and have been manufactured, sold and used for many, many years. Typical of such wheeled containers are wheeled display cases, wheeled luggage and wheeled golf bag/golf club cases. Such wheeled containers or wheeled cases normally include a case body or container body formed of substantially rigid or flexible material, and in either case there is normally a handle and a pair of wheels associated with respective upper and lower ends of the container body. Typically wheeled luggage made of flexible materials includes one or more compartments which can be opened and closed utilizing zippers, whereas a typical rigid golf bag/golf club wheeled case is of a clam-shell construction defined by two body halves which are substantially symmetrical and are unitized by a hinge or a plurality of hinges extending or positioned along longitudinal edges of the container body halves.

Such conventional wheeled cases or containers are relatively adequate for their intended purposes, but one or more of the following disadvantages of such conventional constructions are apparent, particularly to frequent users thereof:

1. Both flexible and rigid wheeled containers or cases are relatively expensive to manufacture because of the complexity of the container bodies and the numerous steps involved in the manufacture thereof. This is particularly true with respect to flexible containers, such as wheeled luggage, in which numerous panels must be cut from flexible material, reinforcement is added thereto, zippers are sewn to the flexible panels, most often a rigidifying spine also serves as a slide-way for an extendable/retractable handle, a pair of wheels are connected to the frame, the frame is united by stitching, sewing, bonding and/or rivets to one of the flexible panels, etc.

2. In the case of wheeled golf bags/golf club cases, a major cost is the expense associated with the die maker manufacturing two identical dies in which the body halves can be injection molded. For example, normal shrinkage after injecting molding creates tolerance variations in the body halves which in turn make it difficult for the edges of the two halves to be accurately hinged together to assure edge-to-edge contact, and the latter most often necessitates the addition of a peripheral gasket or seal between the opposing peripheral edges of the case halves to preclude entry therein of dirt, debris, water, etc. When abused during shipment through mishandling, as often occurs, the case halves are permanently distorted or bent which further precludes consistent edge-to-edge sealing thereafter even upon efforts toward rebending the bent case halves toward their original manufactured orientation and tolerances.

3. Whether such wheeled containers or cases are substantially flexible or substantially rigid, a major ongoing problem in each is the poor quality of the wheels and associated shaft or shafts and the manner in which the latter are attached to the lower end of an associated wheeled container. It is not uncommon to see one or both of a pair of such wheels, particularly if of a relatively large diameter, wobbling precariously as the case is wheeled along a surface, and not uncommonly such wobbling creates forces which flex and progressively weaken an associated shaft or shafts eventually causing the wheels to permanently move out of parallelism relative to each other and thereby render the pulling of the wheeled case quire difficult, particularly if the contents thereof are relatively heavy. Such wheels and/or the shafts associated therewith lack laterally outboard support and the absence of the latter virtually assures the reduction in free-wheeling of the wheels during continued use of the wheeled case.

4. Little, if any, thought has gone into ergonomics of such wheeled cases, and this fact alone creates usage problems which are exasperated over time.

BRIEF SUMMARY OF THE INVENTION

In keeping with present invention, a novel wheeled container or wheeled display case or the like is formed as a one-piece, preferably injection molded polymeric/copolymeric container body defined by an elongated housing closed at a first end by a bottom wall and having an opposite second end defining an opening to which is pivotally attached a cover. The cover includes a recess defined by an end panel merging with a peripheral wall which in turn merges with a substantially annular wall. The upper end of the elongated housing includes a peripheral wall projecting axially upwardly from a substantially annular wall, and the peripheral walls and annular walls are in substantially mating relationship in the closed position of the cover which creates a highly effective seal against exterior contaminants, such as dirt, dust, moisture, etc.

The cover also includes a generally U-shaped handle defined by a pair of legs and a bight hand grip portion therebetween setting-off a hand-receiving recess which is preferably in the form of an opening which when viewed from above is substantially of a T-shaped configuration defined by a leg and oppositely directed arms. Pivot means for connecting the cover to the upper end of the housing is in part defined by two enlarged portions located to one or either side of the leg of the T-shaped opening or slot with each enlargement carrying a pivot pin. The pivot pins are directed toward each other in axially aligned spaced relationship and are interlockingly received in recesses or slots of an axially upwardly projecting reinforcement wall of the housing upper end adjacent the opening thereof. The pivot pin receiving slots or recesses open radially outwardly and each includes a narrow entrance portion and a larger blind end. The polymeric/copolymeric material temporarily yields as the pivot pins are moved radially inwardly through the entrance portions during the assembly of the cover to the container body and eventually seat and pivot in the blind ends, but once the material at the entrance portions inherently returns to its unflexed position, the pivot pins are prevented from escaping therefrom thereby retaining the cover upon the container body absent extraneous/additive/separate hinges, screws, bolts or the like, as are utilized in conventional hinges.

Alternatively, the pins and pivot pin-receiving recesses can be integral components of the respective container body and cover.

The housing peripheral wall is also preferably reinforced by a pair of outwardly thickened wall portions located substantially diametrically opposite each other midway between the pivotal connecting means and latching means for locking the cover to the container body which are also preferably located diametrically opposite to the pivotal connection between the cover and the container body.

The lower end of the housing includes a pair of wheel-receiving recesses opening downwardly and sidewise away from each other. One of each of a pair of wheels is received in an associated one of the wheel-receiving recesses, and a covering plate covers each wheel exteriorly and includes an opening through which projects an end of a shaft journaling each wheel. The end of each shaft is threaded and receives a nut threadably secured thereto. A medial portion of the shaft is supported and journalled in a wall of each recess. In this manner each wheel is sandwiched between a recess and its associated covering plate and a portion of the shaft immediately adjacent either side of an associated wheel is supported by the associated recessed wall and the covering plate. This construction prevents the shaft from bending and the wheels from wobbling thereby assuring parallism in the planes of rotation of the wheels during a lifetime of use of the wheeled container or case. Each wheel-receiving recess preferably is of a depth corresponding to the thickness of its associated wheel and adjacent thereto is a recess of lesser depth which receives a portion of the associated covering plate. Each covering plate is secured to a wall of the latter recess. The latter dimensioning and the thickness of each covering plate assures that an external surface of the covering plate corresponds generally to an exterior surface of the housing exterior surface which is not only aesthetically pleasing but prevents problems associated with exposed wheels, such as exposed wheels catching upon kick moldings, chair legs, furniture legs, etc., which under sufficient loading can simply tear conventional wheels from conventional wheeled containers.

In further accordance with the present invention, a carrying handle is disposed substantially medially along the length of the container body at a side substantially diametrically opposite a pull handle and a pair of wheels, and a pair of shoulder strap attachment loops are located one at each of the housing ends with the pair of loops being disposed at a side of the container body substantially diametrically opposite the pull handle and the pair of wheels. These locations of the carrying handle and the shoulder strap attachments loops are ergonomically correct and facilitate the lifting of the wheeled carrying case with relative ease. Furthermore, a plurality of longitudinally extending closely adjacent reinforcing ribs are located in opposite side reinforcing panels of the housing which effectively rigidify the entirety of the one-piece molded polymeric/copolymeric container body or casing body.

With the above and other objects in view that will hereinafter appear, the nature of the invention will be more clearly understood by reference to the following detailed description, the appended claims and the several views illustrated in the accompanying drawings.

DETAILED DESCRIPTION OF THE INVENTION

Figure 1:
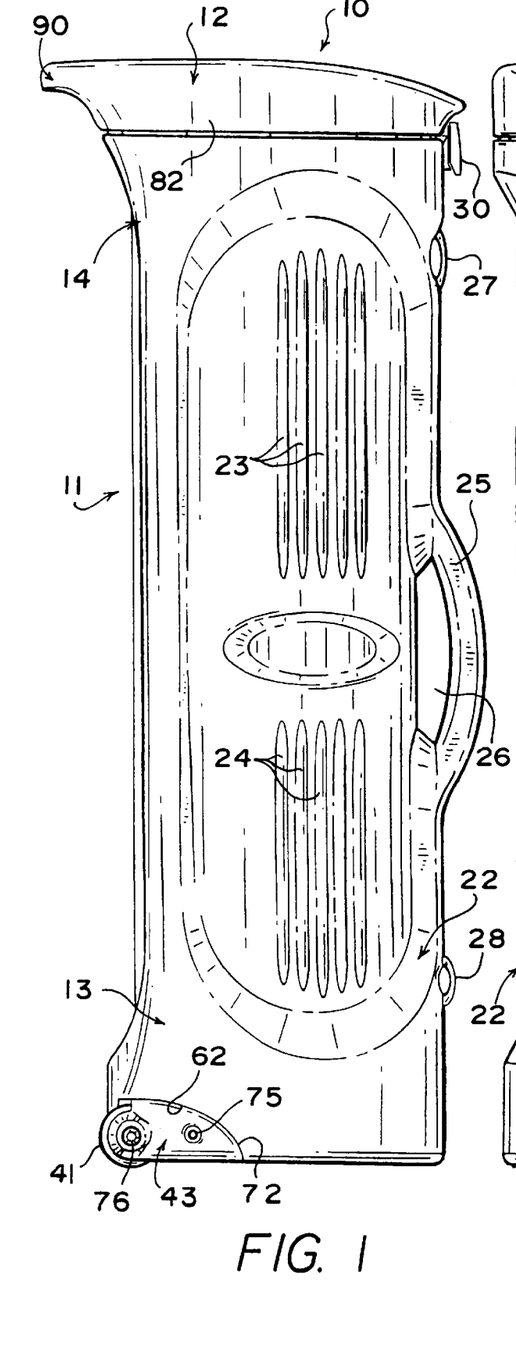
FIG. 1 is a side elevational view of a novel wheeled container or a wheeled case constructed in accordance with this invention, and illustrates a one-piece injection molded polymeric/copolymeric container body which includes a cover pivotally connected at an upper end thereof and carrying a pair of wheels, only one of which is illustrated, covered by a covering plate which is broken away for clarity.
Figure 2:
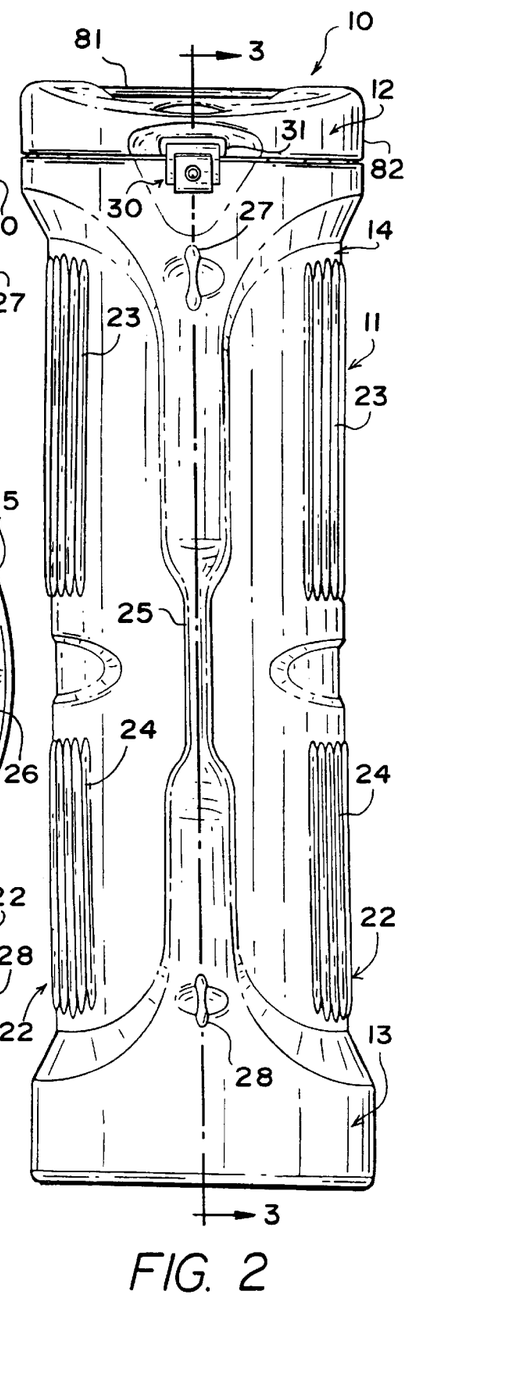
FIG. 2 is an end elevational view of the wheeled casing of FIG. 1, and illustrates a latching mechanism between the cover and an upper end of the case body, diametrically opposite recessed side panels each including a plurality of upper and lower closely adjacent parallel reinforcing ribs, a central handle, and upper and lower carrying strap receiving loops.
Figure 3:
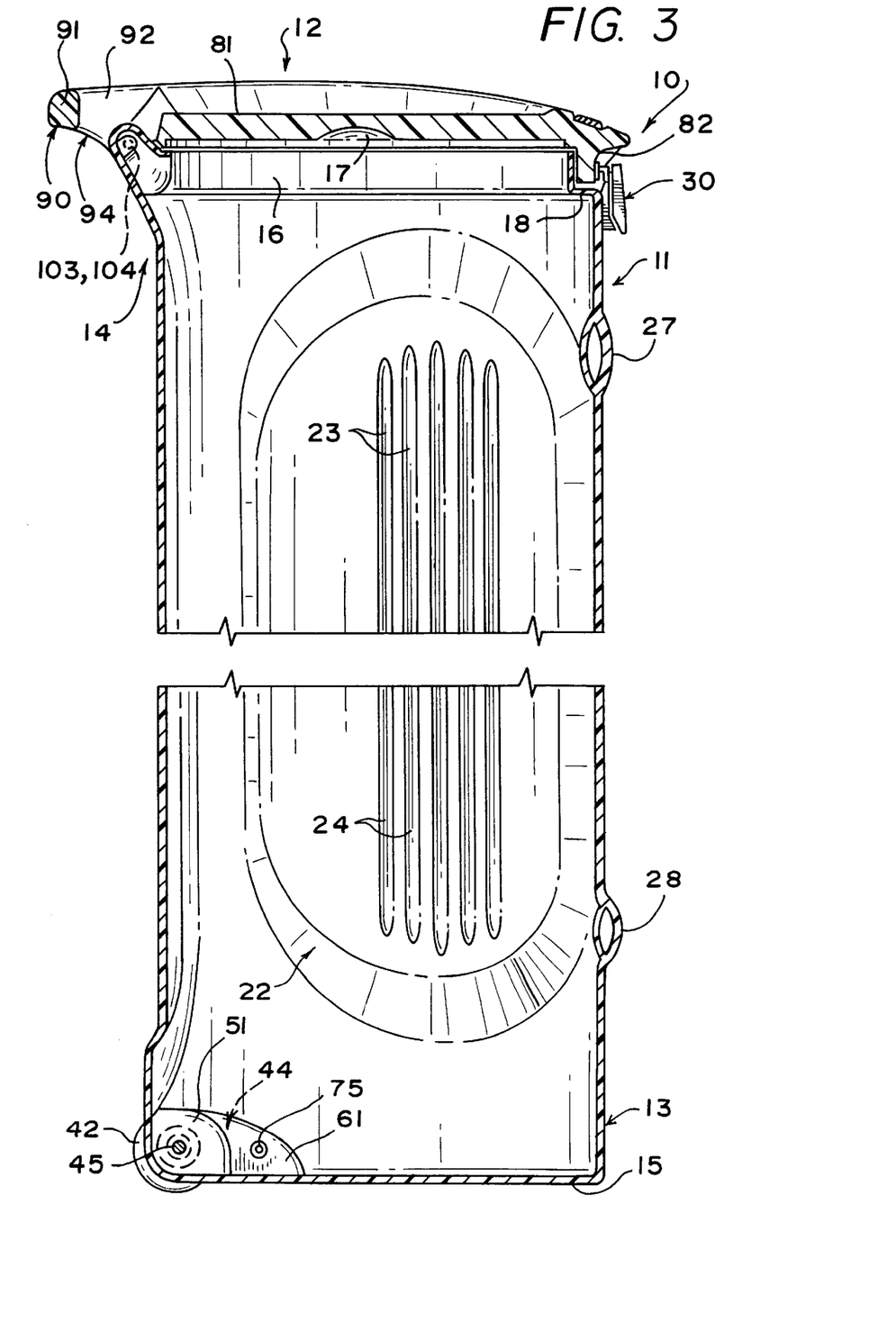
FIG. 3 is an enlarged fragmentary cross-sectional view taken generally along line 3—3 of FIG. 2, and illustrates details of the cover including a recess defined by an end panel and a depending peripheral skirt, a radially outwardly projecting handle, including a hand-receiving opening, and an upwardly projecting terminal peripheral wall of the container body or housing in sealing engagement with the cover peripheral skirt.

A novel wheeled container or wheeled case, specifically and preferably a display case, is illustrated in FIGS. 1 through 3 of the drawings and is generally designated by the reference numeral 10. The wheeled case 10 is defined by a one-piece container or case body 11 and a one-piece cover 12, each being a one-piece substantially homogeneous molded polymeric/copolymeric member with the container body 11 and the cover 12 each being preferably injection molded.

The case body or container body or housing 11 is relatively elongated and includes a first or lower end 13 and a second or upper end 14 with the lower end 13 being closed by a bottom wall 15, and the upper end defining an opening O (FIG. 4) defined by a substantially axially upwardly projecting cylindrical or peripheral wall 16 having a terminal upper edge 17 and merging at a lower end (unnumbered) with an annular wall or shoulder 18. A pair of diametrically opposite thickened wall portions 20, 20 (FIG. 5) extend upwardly from the annular wall 18 and end short of the terminal edge 17. The thickened wall portions 20, 20 lend rigidity to or reinforce the peripheral wall 16 of the upper end or end portion 14 of the housing or body 11. A major portion (unnumbered) of the annular wall 18 lies in a generally radial plane normal to a longitudinal axis A (FIG. 5) of the casing body 11 while a minor portion (unnumbered) of the annular wall 18 converges upwardly and defines an upwardly converging wall portion 21 of the upper housing portion 14 (FIG. 5) for a purpose to be described more fully hereinafter.

Opposite sides (unnumbered) of the housing 11 include elongated oval-shaped recesses 22 which reinforce the housing 11 and each wall (unnumbered) of each recess 22 is itself further recessed by an upper plurality of side-by-side parallel reinforcing ribs 23 and a plurality of lower side-by-side parallel reinforcing ribs 24. A carrying handle 25 defining a hand-receiving opening 26 is disposed between the two recess panels 22 at approximately one-half the distance between the opening O and the bottom wall 15. A pair of shoulder strap receiving loops 27, 28 are disposed in substantial longitudinal alignment with the handle 25 and are respectively positioned above and below the handle 25. Conventional latching means 30, 31 are carried respectively by the upper end 14 of the case body or housing 11 and the cover 12.

Figure 6:
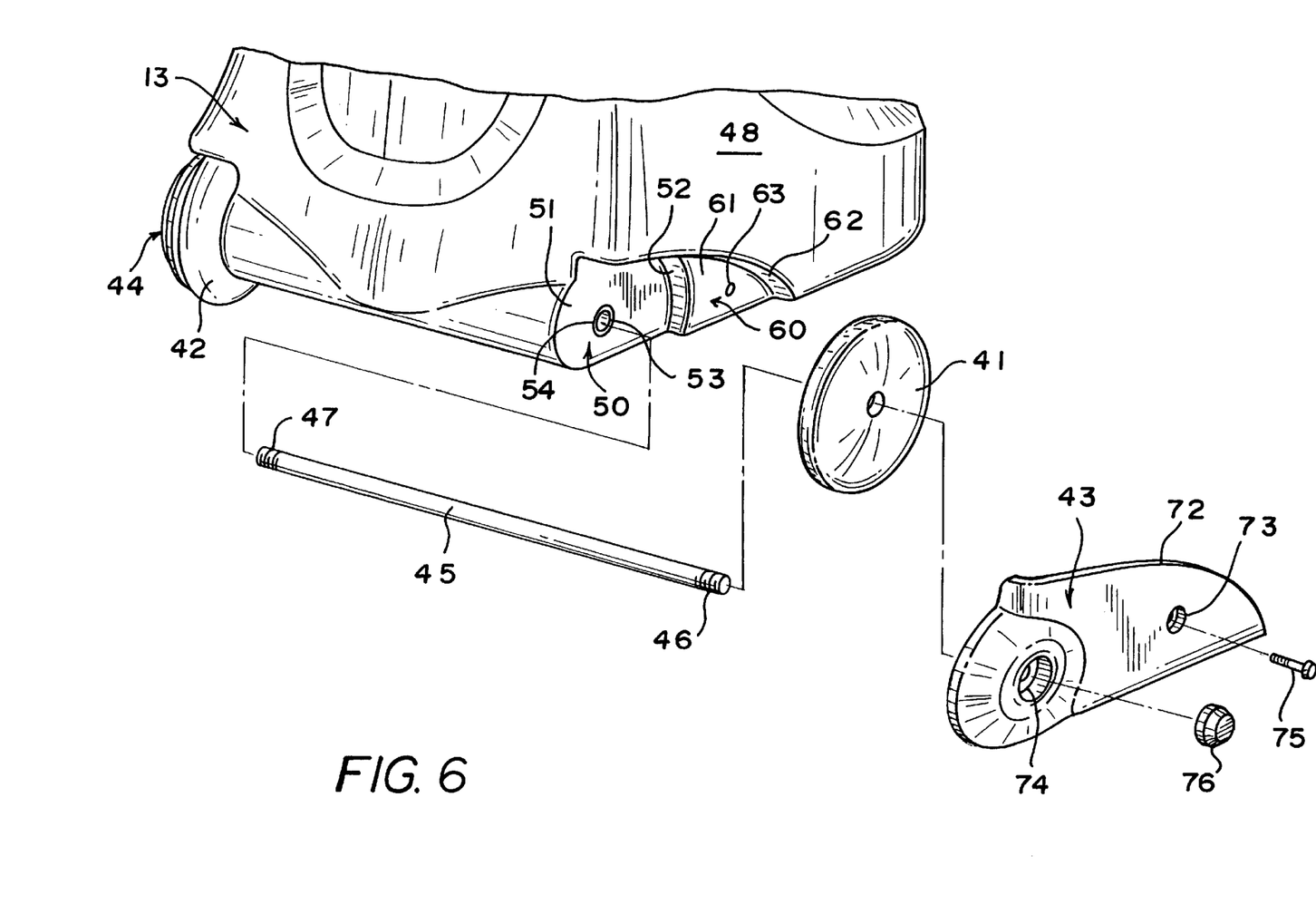
FIG. 6 is a fragmentary exploded view of a lower portion of the case body, and illustrates the manner in which opposite ends of a shaft are retained in and supported by journals in walls of wheel-receiving recesses and an opening in a cover plate which is in turn secured to another recess of the housing adjacent each wheel-receiving recess.

Reference is specifically directed to FIG. 6 and a pair of identical wheels 41, 42 and covering means or cover plates 43, 44, respectively, associated therewith. A shaft 45 of a cylindrical configuration includes opposite threaded ends 46, 47. Opposite lower side walls 48, only one of which is shown, are stepped-recessed to define a relatively deep wheel-receiving recess 50 defined by a relatively flat wall 51 and a curved wall 52 with the flat wall 51 having an opening 53 formed therein which may be reinforced by a cylindrical metal sleeve 54. A cover plate-receiving recess 60 is shallower than the wheel-receiving recess 50 and is defined by a wall 61 substantially parallel to the wall 51 and an arcuate wall 62 with the wall 61 having an opening 63 formed therein. The recesses 50, 60 associated with the wheel 41 are replicated identically at the opposite side wall (unnumbered) of the lower end portion 13 of the housing 11 associated with the wheel 42 and the covering means or covering plate 44 (FIG. 3). The covering means or covering plates 43, 44 are also identical and each includes an edge 72 (FIG. 6) contoured to the configuration of the wall 62, an opening 73 and an opening 74.

The wheels 41, 42 and the covering plates 43, 44 are assembled to the lower end 13 of the housing 11 by inserting the shaft 45 through the openings 53 of the opposite generally parallel walls 51, 51 or the cylindrical metal sleeves 54 associated therewith. The threaded ends 46, 47 project equal distances beyond the walls 51 and the wheels 41, 42 are slipped over and beyond the threaded end portions 46, 47, respectively, of the shaft 45.

The covering plates 43, 44 are then seated in the recesses 61 with the edges or walls 62, 72 contiguous each other with the threaded ends 46, 47 of the shaft 45 projecting outwardly of the openings 74 of the covering plates 43, 44. A conventional threaded fastener 75 is passed through the opening 73 of each covering plate 43, 44 and is threaded into the opening 63 to rigidly connect each of the covering plates 43, 44 in abutting relationship with the walls 61. A conventional cap nut 76 is then threaded upon the threads 46, 47 of the shaft 45. Since the wall 52 is substantially of a depth corresponding to the thickness of the wheels 41, 42, the wall 51 and the inner surface (unnumbered) of the covering plates 43, 44 opposing the wall 51 define a wheel chamber having a depth corresponding to the thickness of the wheels 41, 42 thereby assuring that the wheels 41, 42 are at all times in parallel relationship to each other and are confined for rotation in parallel planes. Furthermore, since the shaft 45 is supported by both the wall 51 and the covering plate 43, 44 immediately adjacent each wheel 41, 42, the shaft 45 cannot deflect under heavy loads and the wear-life thereof is immeasurably extended beyond known conventional wheeled containers. Moreover, should the wheels 41, 42 require repair or replacement due to long years of normal wear and tear, the same can be readily replaced by rapidly removing each of the covering plates 43, 44 in the manner obvious from the latter description.

Figure 4:
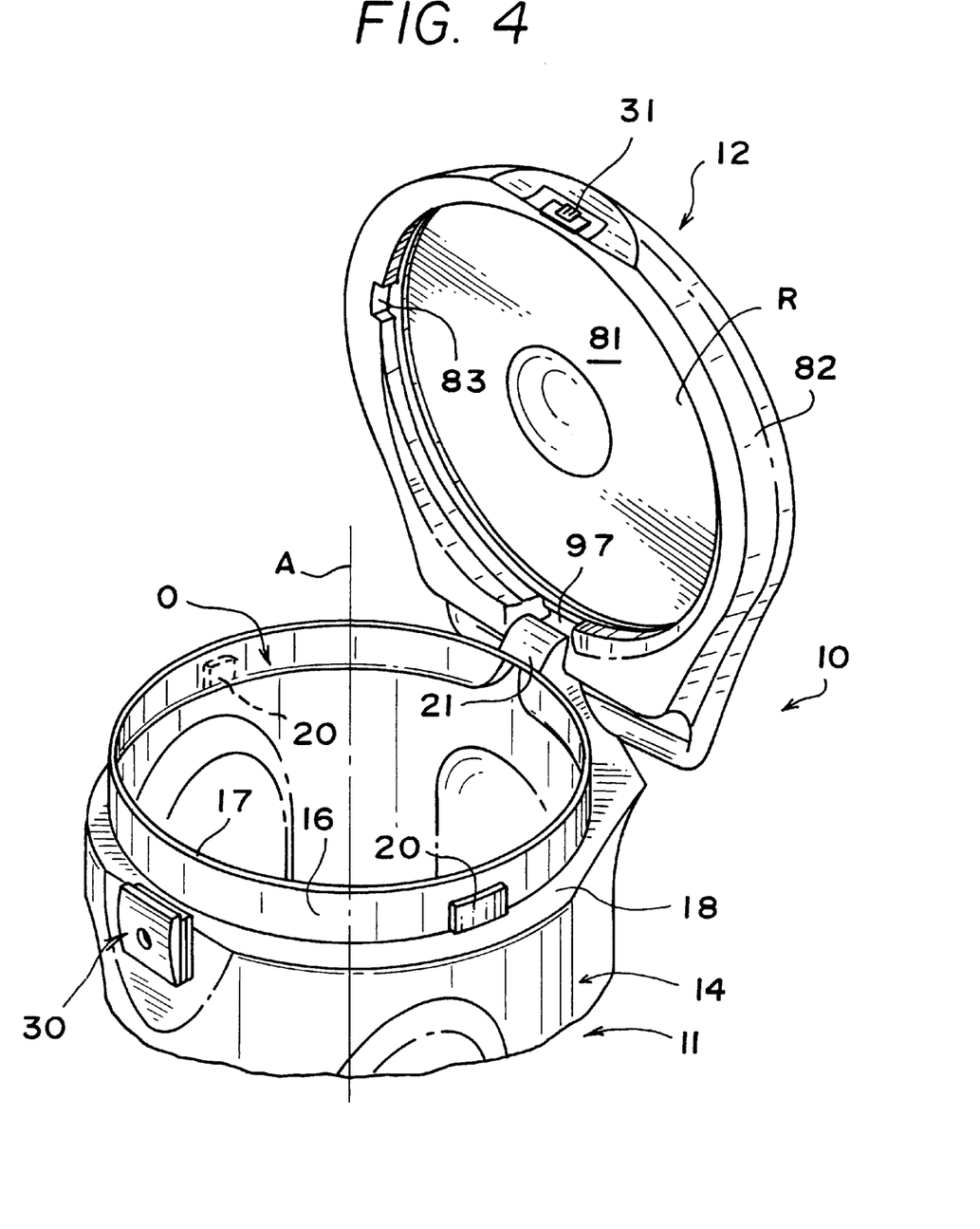
FIG. 4 is a fragmentary perspective view of an upper portion of the wheeled case, and illustrates the cover in its opened position.
Figure 5:
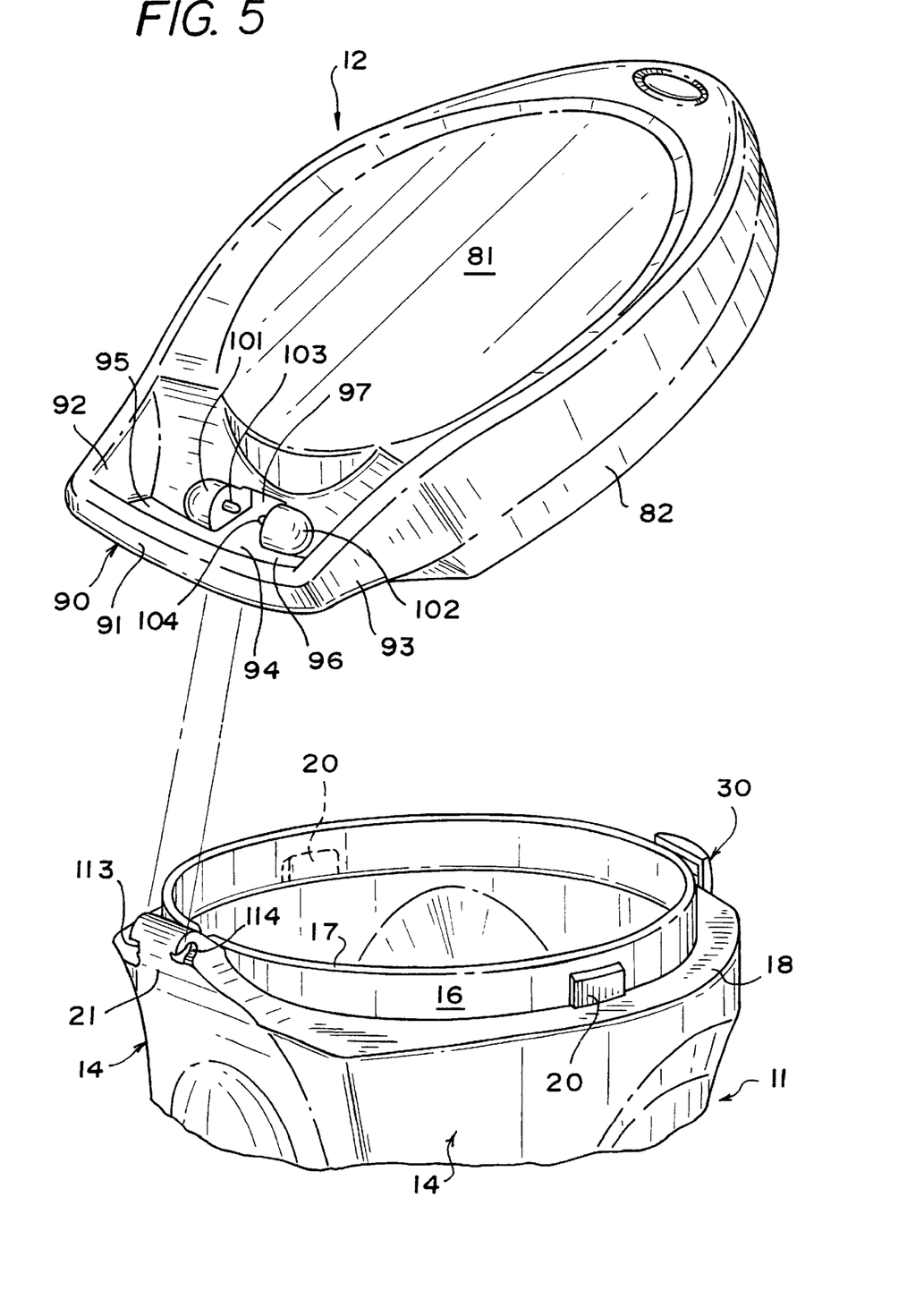
FIG. 5 is an exploded fragmentary view of an upper portion of the container housing and the cover, and illustrates integrally molded pivot pins carried by enlarged reinforced wall portions of the cover across from a handgrip portion of the handle with the pivot pins being snap-secured in substantially radially outwardly opening pin-receiving recesses or slots in an axially upwardly projecting wall portion of the housing upper end.

Reference is specifically made to FIGS. 3 through 5 of the drawings and the cover 12 thereof which includes an interior generally cylindrical recess R defined by a substantially circular end panel or end wall 81 and a depending peripheral wall or peripheral skirt 82 having an inner surface (unnumbered) corresponding in size and configuration to the exterior surface (unnumbered) of the peripheral wall 16 (FIG. 4) of the upper end 14 of the housing 11. Diametrically opposite inner surfaces of the peripheral wall or skirt 82 are preferably relieved or slotted to form recesses 83 into which the thickened wall portions 20 seat when the cover 12 is closed and latched/locked.

A pull handle 90 is disposed substantially diametrically opposite the latching means 30, 31 and includes a hand grip or bight portion 91 and a pair of opposite arms or legs 92, 93 merging with the peripheral wall or peripheral skirt 82 and setting-off therewith recess means in the form of T-shaped opening or slot 94 defined by oppositely directed arms 95, 96 and a leg 97. To either side of the leg 97 the peripheral skirt 82 is reinforced by relatively large thickened wall portions 101, 102 carrying pivoting means in the form of respective pivot pins or pivot pin portions 103, 104 which are in axially aligned opposed spaced relationship to each other. The pivot pins or pivot pin portions 103, 104 are formed during the molding of the integral one-piece homogeneous cover 12, as by injection molding, or can be instead formed as separate pins threaded into the enlarged or thickened wall portions 101, 102 after the molding of the cover 12. Complementary pivot pin-receiving recesses or slots 113, 114 are integrally formed in the upwardly converging wall portion 21 (FIG. 5) of the upper end portion 14 of the housing 11. Each of the slots 113, 114 opens generally radially outwardly of the longitudinal axis A, and each slot 113, 114 includes an entrance portion (unnumbered) narrower than the diameter of the pivot pins 103, 104 and a blind end portion (unnumbered) corresponding in diameter to the diameter of the pivot pins 103, 104. The pivot pins 103, 104 are forced through the narrow entrance openings or opening portions of the respective slots 113, 114 which is achieved by the flexible nature of the polymeric/copolymeric material. However, once the pivot pins 103, 104 pass the narrow entrance portions, the material thereof rebounds, the pivot pins 103, 104 seat and are journalled for rotation in the blind end portions of the recesses 113, 114, and the cover 12 readily pivots between the open (FIG. 4) and closed (FIG. 3) positions thereof.

It is to be particularly noted that the location of the pivot means 103, 104, 113 and 114 and the pull handle 90 are substantially in overlying relationship to the wheels 41, 42, as is readily apparent from FIG. 3 of the drawings. Thus, the hand grip portion 91 of the handle 90 can be gripped when the latching means 30, 31 is closed and the wheeled case can be tilted and pulled in a conventional manner.

Although a preferred embodiment of the invention has been specifically illustrated and described herein, it is to be understood that minor variations may be made in the apparatus without departing from the spirit and scope of the invention, as defined the appended claims.

What is claimed is:

1. A wheeled container comprising a one-piece molded polymeric/copolymeric container body defined by an elongated housing closed at a first end by a bottom wall and having an opposite second end defining an opening, a one-piece molded polymeric/copolymeric cover, means for pivotally connecting said cover to a peripheral edge portion of said second end for pivotal movement between a first closed and a second open position respectively closing and opening said second end opening, said cover including a handle projecting substantially radially away from a longitudinal axis of said housing, a pair of relatively spaced wheels located at said first end at a side of said housing corresponding to a side from which the handle projects, means disposed substantially diametrically opposite to said handle for retaining said cover in said closed position, said cover including a recess defined by an end panel merging with a peripheral wall which in turn merges with a substantially annular wall, said housing second end including a peripheral wall radially inward of and projecting axially upwardly from a substantially annular wall, and said peripheral walls and said annular walls being in substantially mating relationship in said closed position.

2. The wheeled container as defined in claim 1 including means for reinforcing said housing second end peripheral wall, and said reinforcing means are at least a pair of outwardly thickened portions of said housing second end peripheral wall.

3. The wheeled container as defined in claim 1 wherein said housing second end annular wall includes a major circumferentially extending annular wall portion and a minor circumferentially extending annular wall portion, and said minor circumferentially extending wall portion defines at least in part said pivotally connecting means.

4. The wheeled container as defined in claim 2 wherein each of said outwardly thickened portions terminate axially below a free terminal upper edge of said housing second end peripheral wall.

5. The wheeled container as defined in claim 2 wherein each of said outwardly thickened portions terminate radially short of a radially outermost substantially circular edge of said housing second end annular wall.

6. The wheeled container as defined in claim 2 wherein said outwardly thickened portions are in substantially diametrically opposite relationship to each other.

7. The wheeled container as defined in claim 3 wherein said pivotally connecting means include pivotally connected pin means and recess means, and said minor circumferentially extending wall portion defines said recess means.

8. The wheeled container as defined in claim 3 wherein said minor circumferentially extending annular wall portion defines an upwardly converging wall portion.

9. The wheeled container as defined in claim 3 wherein said minor circumferentially extending annular wall portion defines an upwardly converging wall portion projecting axially above a free terminal edge of said second end peripheral wall.

10. The wheeled container as defined in claim 4 wherein each of said outwardly thickened portions terminate radially short of a radially outermost substantially circular edge of said housing second end annular wall.

11. The wheeled container as defined in claim 4 wherein said outwardly thickened portions are in substantially diametrically opposite relationship to each other.

12. The wheeled container as defined in claim 5 wherein said outwardly thickened portions are in substantially diametrically opposite relationship to each other.

13. The wheeled container as defined in claim 10 wherein said outwardly thickened portions are in substantially diametrically opposite relationship to each other.

14. The wheeled container as defined in claim 7 wherein said recess means are slot means opening in a direction away from said longitudinal axis.

15. The wheeled container as defined in claim 7 wherein said recess means are a pair of slot means opening in a direction away from said longitudinal axis.

16. The wheeled container as defined in claim 8 wherein said pivotally connecting means include pivotally connected pin means and recess means, and said upwardly converging wall portion defines said recess means.

17. The wheeled container as defined in claim 16 wherein said recess means are slot means opening in a direction away from said longitudinal axis.

18. The wheeled container as defined in claim 16 wherein said recess means are a pair of slot means opening in a direction away from said longitudinal axis.

19. A wheeled container comprising a one-piece molded polymeric/copolymeric container body defined by an elongated housing closed at a first end by a bottom wall and having an opposite second end defining an opening, a one-piece molded polymeric/copolymeric cover, means for pivotally connecting said cover to a peripheral edge portion of said second end for pivotal movement between a first closed and a second open position respectively closing and opening said second end opening, said cover including a handle projecting substantially radially away from a longitudinal axis of said housing, a pair of relatively spaced wheels located at said first end at a side of said housing corresponding to a side from which the handle projects, means disposed substantially diametrically opposite to said handle for retaining said cover in said closed position, said handle defining a hand-receiving opening and including a hand grip portion, and said pivotally connecting means are located at an opposite side of said hand-receiving opening substantially across from said hand grip portion.

20. The wheeled container as defined in claim 19 wherein said pivotally connecting means includes pin means of said cover engaging pin-receiving means of said second end housing side.

21. The wheeled container as defined in claim 19 wherein said pivotally connecting means includes pin means of one of said cover and said second end housing side for engaging pin-receiving means of the other of said cover and said second end housing side, and said pin-receiving means are recess means which open in a direction away from said longitudinal axis and toward said hand grip portion in the closed position of the cover.

22. The wheeled container as defined in claim 19 wherein said pivotally connecting means includes pin means of said cover engaging pin-receiving means of said second end housing side, and said pin-receiving means are a pair of recesses opening in a direction away from said longitudinal axis.

23. The wheeled container as defined in claim 19 wherein said pivotally connecting means includes pin means of said cover engaging pin-receiving means of said second end housing side, said pin means are a pair of pins, said pin-receiving means are a pair of recesses, a pin of each pair of pins is received in a recess of each pair of recesses, said pins project toward each other, and said recesses open in a direction away from said longitudinal axis in substantial axial alignment.

24. The wheeled container as defined in claim 19 wherein said hand-receiving opening is of a substantially T-shaped configuration defined by a leg opening portion and a cross arm opening portion, and said cross arm opening portion sets off said hand grip portion.

25. The wheeled container as defined in claim 20 wherein said handle and cover peripheral wall define a substantially T-shaped opening defined by a leg opening portion bridged by a cross arm opening portion, said cross arm opening portion in part defines a hand grip portion of said handle, and said pivotally connecting means are disposed at said leg opening portion.

26. The wheeled container as defined in claim 22 wherein said handle and cover peripheral wall define a substantially T-shaped opening defined by a leg opening portion bridged by a cross arm opening portion, said cross arm opening portion in part defines a hand grip portion of said handle, and said pin means and pin-receiving means are disposed at said leg opening portion.

27. The wheeled container as defined in claim 23 wherein said handle and cover peripheral wall define a substantially T-shaped opening defined by a leg opening portion bridged by a cross arm opening portion, said cross arm opening portion in part defines a hand grip portion of said handle, and said pair of pins and said recesses are disposed at said leg opening portion.

28. A wheeled container comprising a one-piece molded polymeric/copolymeric container body defined by an elongated housing closed at a first end by a bottom wall and having an opposite second end defining an opening, a one-piece molded polymeric/copolymeric cover, means for pivotally connecting said cover to a peripheral edge portion of said second end for pivotal movement between a first closed and a second open position respectively closing and opening said second end opening, said cover including a handle projecting substantially radially away from a longitudinal axis of said housing, a pair of relatively spaced wheels located at said first end at a side of said housing corresponding to a side from which the handle projects, means disposed substantially diametrically opposite to said handle for retaining said cover in said closed position, said housing first end including a pair of wheel-receiving recesses opening downwardly and sidewise away from each other, one of said pair of wheels is received in an associated one of said wheel-receiving recesses, another recess adjacent each wheel-receiving means, each another recess being recessed a lesser distance from an exterior surface of said housing first end than the recessed distance of an adjacent wheel-receiving recess from the housing first end exterior surface, means for covering each wheel and substantially sidewise closing each wheel-receiving recess, and said covering means is in part seated in each another recess.

29. The wheeled container as defined in claim 28 wherein each covering means is a covering plate.

30. The wheeled container as defined in claim 28 including means for securing said wheels to said housing first end through said covering means.

31. The wheeled container as defined in claim 29 including means for securing each covering plate to a wall portion of an associated another recess.

32. The wheeled container as defined in claim 31 including means for securing said wheels to said housing first end through said covering means.

* * * * *